Sept. 15, 1942.　　　　J. DOETSCH　　　　2,295,721
FRUIT HALVING KNIFE
Filed Aug. 4, 1941
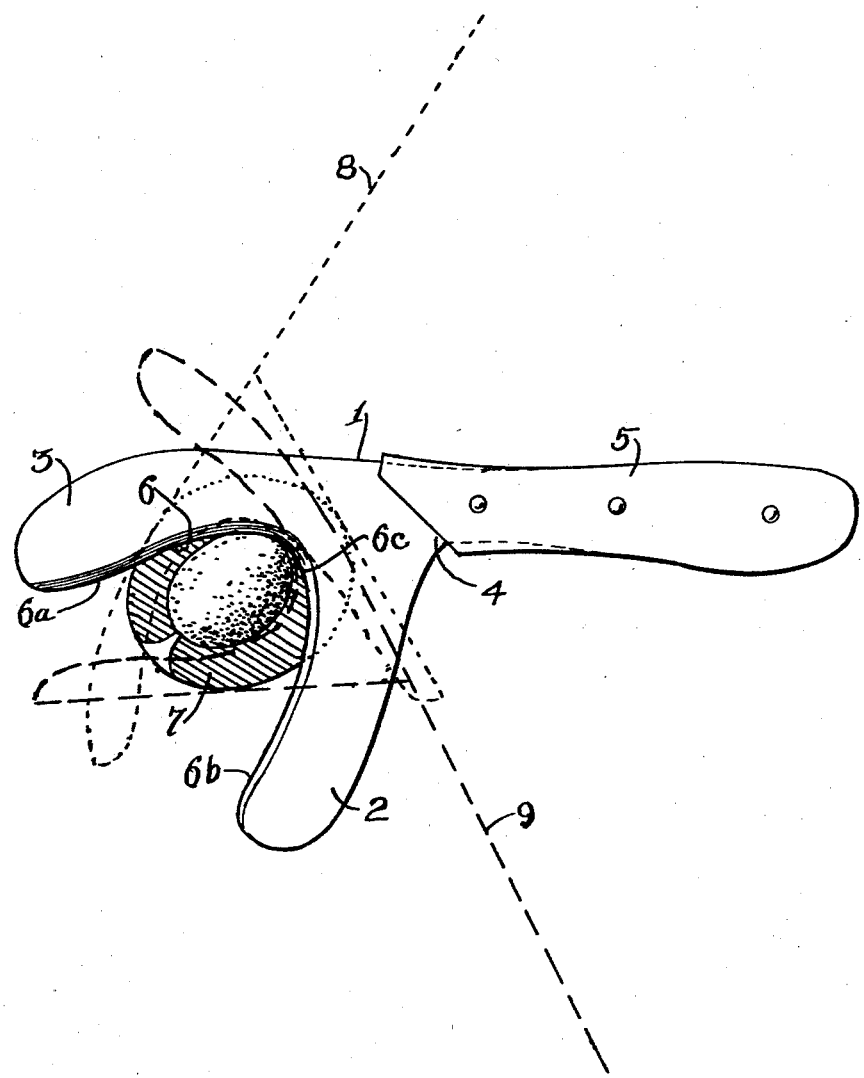
INVENTOR
Joseph Doetsch
John A. Naismith
ATTORNEY Patented Sept. 15, 1942

2,295,721

UNITED STATES PATENT OFFICE 2,295,721

FRUIT HALVING KNIFE

Joseph Doetsch, near Los Gatos, Calif.

Application August 4, 1941, Serial No. 405,370

1 Claim. (Cl. 30—353)

The present invention relates particularly to a type of knife for use in the halving of drupaceous fruits, particularly the apricot.

In preparing certain fruits, such as the apricot, for drying, the first step is to cut each fruit into two halves and remove the stone therefrom. In performing this operation it has heretofore been the custom to use a small, straight edged blade with a handle attached thereto, of the kind commonly known as a paring knife for fruits and vegetables. But in using that kind of a knife it is necessary for the operator to rotate the fruit in the hand in order to encircle the stone, or pit, with the complete circular cut necessary to divide the fruit into two halves.

It is, therefore, the object of the present invention to provide a knife with its cutting edge so formed, and so arranged with respect to the handle of the knife, that the fruit may be cut into the two halves without the necessity of the operator shifting or rotating the fruit, and thereby greatly speeding up the operation.

The drawing is a side elevation of a knife embodying my invention in operative position relative to a halved fruit.

In carrying out my invention a blank, indicated generally at 1, is struck from a sheet of suitable sheet metal. This blank 1 has one portion that is substantially U shaped, the two arms of this portion being indicated at 2 and 3, and another portion as 4, that forms a shank for a handle 5. The shank and handle 4—5 is disposed to lie in alignment with the main portion of the arm 3 which is to be considered the top arm of the knife.

The inner edge of this U shaped portion is sharpened to form a keen cutting edge 6, and the outer ends of the cutting edge may be curved inwardly toward each other as at 6a and 6b.

In use the fruit 7 may be held in any one of several different positions just so long as the knife will sever the flesh in the plane of the dorsal and ventral sutures of the pit within. With the fruit 7 in the position shown, and held stationary in one hand of the operator, the knife is held in the other hand of the operator and first placed in the position indicated by the dotted lines at 8. In this position the cutting edge of the top arm 3, and the base portion 6c thereof, cuts substantially one-half way around the fruit, a slight movement forward assuring a complete half-way cut. Then by swinging the handle 5 around to the position shown in dotted lines at 9, or a little therebeyond, complete encirclement of the pit 10 is effected, and the flesh of the fruit is completely halved.

In order to effect the cutting of the fruit with the single circular movement, it is important that the edges 6a and 6b curve inwardly toward each other to some degree, and that the base portion of the edge 6c be sufficiently round to cut around the adjacent end of the pit without having to be drawn around it with a shearing movement as in the case of the common knife.

Although but one specific embodiment of the invention has been herein illustrated and described, it will be understood that various alterations in the details of construction and mode of application and assembly, may be made without departing from the scope of the invention as indicated in the accompanying claim.

I claim:

As a new article of manufacture, a fruit halving knife comprising, a substantially U shaped body portion forming top and bottom arms and having a handle extending from its base in alignment with its top arm, the inner edge only of the U shaped portion being sharpened to form a keen cutting edge terminating at the ends of both arms, and the opposing edges of the two arms being curved slightly inwardly toward each other.

JOSEPH DOETSCH.